US 6,737,593 B1

(12) United States Patent
Porter et al.

(10) Patent No.: US 6,737,593 B1
(45) Date of Patent: May 18, 2004

(54) NON-REVERSING WINDSHIELD WIPER MOTOR PARK SWITCH

(75) Inventors: Eugene B. Porter, Clarkston, MI (US); Frank R. Lombardo, Rochester, NY (US); Gregory Hickey, Bellbrook, OH (US); Christopher Jones, Dayton, OH (US); Harald Klode, Dayton, OH (US); James Jackson, Maurepas (FR)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 564 days.

(21) Appl. No.: 09/628,265

(22) Filed: Jul. 28, 2000

(51) Int. Cl.[7] .............................................. H01H 19/00
(52) U.S. Cl. ................................ 200/19 R; 200/DIG. 2
(58) Field of Search ......................... 200/61.54–61.57, 200/61.27–61.38, 19 R, 566, 19.01, 19.36; 335/205–207

(56) References Cited

U.S. PATENT DOCUMENTS

| 4,259,624 A | | 3/1981 | Seibicke ..................... 318/282 |
|---|---|---|---|
| 4,355,270 A | | 10/1982 | Cook et al. ................. 318/801 |
| 4,475,263 A | * | 10/1984 | Lystad ....................... 15/250.21 |
| 4,547,716 A | | 10/1985 | Johnson ...................... 318/443 |
| 4,609,794 A | | 9/1986 | Porter ........................... 200/24 |
| 4,700,026 A | | 10/1987 | Kamiyama et al. ........... 200/19 |
| 4,787,115 A | * | 11/1988 | Clokie ....................... 15/250.21 |
| 4,916,774 A | * | 4/1990 | Arlon et al. .............. 15/250.16 |
| 5,068,500 A | | 11/1991 | Kitada ......................... 200/19 |
| 5,133,221 A | * | 7/1992 | Bruhn et al. ..................... 74/25 |
| 5,142,728 A | * | 9/1992 | Yamamoto et al. ....... 15/250.13 |
| 5,147,989 A | | 9/1992 | Ito ............................... 200/11 |
| 5,203,602 A | * | 4/1993 | Eustache .................. 296/96.15 |
| 5,271,121 A | * | 12/1993 | Dolegowski ................ 15/250.3 |
| 5,422,449 A | | 6/1995 | Kano et al. | 
| 5,755,140 A | * | 5/1998 | Turbessi et al. ......... 74/501.5 R |
| 5,771,526 A | * | 6/1998 | Burton ...................... 15/250.19 |
| 5,983,439 A | * | 11/1999 | Hojnacki .................... 15/250.3 |
| 6,255,605 B1 | * | 7/2001 | Leiter et al. ................ 200/19.2 |
| 6,351,088 B1 | * | 2/2002 | Lombardo et al. ............. 318/9 |
| 6,384,557 B1 | * | 5/2002 | Weber et al. ................. 318/444 |

FOREIGN PATENT DOCUMENTS

| DE | 1 061 641 | | 11/1956 |
|---|---|---|---|
| DE | 2 026 548 | | 12/1971 |
| DE | 71 45 933 | | 12/1971 |
| DE | 26 21 370 | | 1/1977 |
| DE | 34 40 764 | | 5/1986 |
| DE | 4228492 | * | 3/1994 |
| EP | 0 398 630 | | 11/1990 |
| EP | 531793 | * | 3/1993 |
| EP | 953488 | * | 11/1999 |
| GB | 2 101 405 | | 1/1983 |

* cited by examiner

Primary Examiner—Michael Friedhofer
Assistant Examiner—Lisa N. Klaus
(74) Attorney, Agent, or Firm—J. Gordon Lewis

(57) ABSTRACT

A windshield wiper drive apparatus includes a non-electrical contact position detector of the wiper inwipe position. A magnet is rotated by the wiper drive gear and moves past a magnetically responsive sensor mounted within the drive housing to detect the inwipe position of the wipers. In one aspect, a rotatable cam is mounted in the housing and carries the magnet. Interengaging members on the drive gear and the cam cause rotation of the cam in only the normal direction of rotation of the drive gear. Any back movement of the drive gear through interfering contact of the wiper blades with an obstruction separates the drive gear interengaging member from the cam preventing movement of the cam.

7 Claims, 4 Drawing Sheets

NON-REVERSING WINDSHIELD WIPER MOTOR PARK SWITCH

BACKGROUND

The present invention relates, in general, to vehicle windshield wipers and, more specifically to windshield wiper park switches.

In vehicle windshield wiper drive apparatus, the wipers are provided with an automatic home or park position stop device which enables the wiper blades to return to the park position regardless of when a user turns off a wiper switch during the wiping cycle.

In a typical wiper park switch, an electrically conductive plate is provided with an electrically conductive and electrically non-conductive portions or traces. An electrical contact(s) fixed or otherwise driven by the drive gear coupled to the wiper drive motor cooperates with the electrically conductive plate to form a switch which opens and closes an electrical circuit to the power terminals of the wiper drive motor so that even when the user turns off the wiper switch during the wiping cycle, the electrically conductive plate and the contact(s) complete a circuit which enables the wiper motor to continue to operate to return the wiper blade to the park position. The contact(s) is typically driven or moved by the drive gear between the two positions, one forming a closed switch with the electrically conductive plate and the other forming an open circuit.

However, prior vehicle windshield wiper drive mechanisms of this type experience several problems. First, the park switch contact(s) is moved into and out of contact with the conductive traces on the conductive plate many times during a wiping operation. This causes wear of the contact and require a more robust wiper and contact design with adds to the cost of manufacturing the vehicle wiper. Despite such robust designs, the contacts are still susceptible to wear over long term use which could cause intermittent or loss of entire contact with the conductive plate.

Further, the contacts are susceptible to grease and other foreign materials which may be deposited on the conductive plate or the contacts which could also lead to loss of electrical contact with the conductive plate.

More importantly, prior wiper driving apparatus with conventional park switches frequently experience chatter when snow or other obstructions over a lower portion of the vehicle windshield prevent the wiper blades from returning to the park position. In this situation, the drive gear of the wiper motor is subjected to a force which acts in a direction counter to the normal direction of rotation of the drive gear. The snow or other obstruction places a spring force on the wiper blades which reverse drive the wiper blades and the attached drive gear away from the park position. Thus, as soon as the wiper drive motor is switched off by the park position switch, the reverse movement of the wiper blades and drive gear causes the contact(s) to re-engage the conductive portion of the conductive plate thereby reapplying electrical power to the wiper drive motor and causing the drive motor to restart movement of the wiper blades toward the park position. The blades are then placed in oscillation between park and non-park states which could lead to, damage to the wiper blades or wiper drive linkage, electrical wear of the electrical contacts and/or the wiper drive motor, as well as creating objectionable noise or chatter for the occupants of the vehicle.

Thus, it would be desirable to provide a windshield wiper drive apparatus which overcomes the above-mentioned problems encountered over the previously devised wiper park switches. It would also be desirable to provide a park switch mechanism for a vehicle windshield wiper drive apparatus which eliminates movable contacting portions for the park switch. It would also be desirable to provide a windshield wiper drive apparatus which has a single housing and drive gear design for different windshield wiper applications, including both intermittent and non-intermittent wiper apparatus.

SUMMARY

The present invention is an improved windshield wiper drive apparatus which features a non-electrical contact position detection or sensor for detecting the inwipe or park position of the wiper blades. In another aspect, a portion of the non-electrical contact sensor is carried on a rotatable cam mounted in the windshield wiper drive housing which is rotated by the drive gear through interengaging members on the drive gear and the cam in the normal direction of rotation of the drive gear. Back drive of the drive gear does not result in reverse rotation of the cam thereby preventing chatter of the wiper blades.

In a specific aspect of the present invention, the windshield wiper apparatus includes a rotatable drive gear adapted to be coupled to a windshield wiper for driving the windshield wipers, a housing with the drive gear rotatably mounted in the housing, and a non-contact position sensor cooperatively arranged between the drive gear and the housing for detecting a rotation position of the drive gear corresponding to the windshield wiper park position.

Specifically, the position detector is formed of a magnetically responsive sensor mounted in the housing, a magnet movably disposed in the housing in an intersecting path of movement with respect to the sensor. The magnet is movable with the drive gear, with the sensor detecting each passage of the magnet therepast.

The magnet is mounted on the drive gear in one aspect of the present invention. In an alternate aspect, a cam is rotatably mounted in the housing. In this aspect, the magnet is mounted on the cam. Interengaging members on the drive gear and the cam cause rotation of the cam in the normal direction of rotation of the drive gear. The interengaging members are, in one example, projections formed on the cam and the drive gear which lie in intersecting rotatable paths.

The cam is arranged for only unidirectional rotation in the normal direction of rotation of the drive gear. Any back drive of the drive gear caused by the wiper blades hitting an obstruction when moving toward the park position separates the interengaging member on the drive gear from the cam leaving the cam in the park position and preventing the re-application of electrical power to the wiper drive motor.

The windshield wiper drive apparatus of the present invention overcomes several problems encountered with previous wiper apparatus, particularly contact wear and the oscillatory chatter and movement of the wipers when an obstruction prevents the wiper blades from reaching the full inwipe or park position.

The non-contact magnetic sensor employed in the present invention eliminates the direct electrical contact in previous wiper designs thereby increasing the long term reliable use of the wiper drive apparatus of the present invention. In the aspect of the invention where the magnet of the inventive position detector is mounted on the cam rotatably carried in the wiper drive housing, the cam is arranged for only unidirectional rotation thereby eliminating any re-application of electrical power to the wiper drive motor even if the wiper drive gear is back driven when the wiper blades hit an obstruction when moving toward the fall inwipe or park position.

BRIEF DESCRIPTION OF THE DRAWINGS

The various features, advantages and other uses of the present invention will become more apparent by referring the following detailed description and drawing in which.

DETAILED DESCRIPTION

Figure 1:
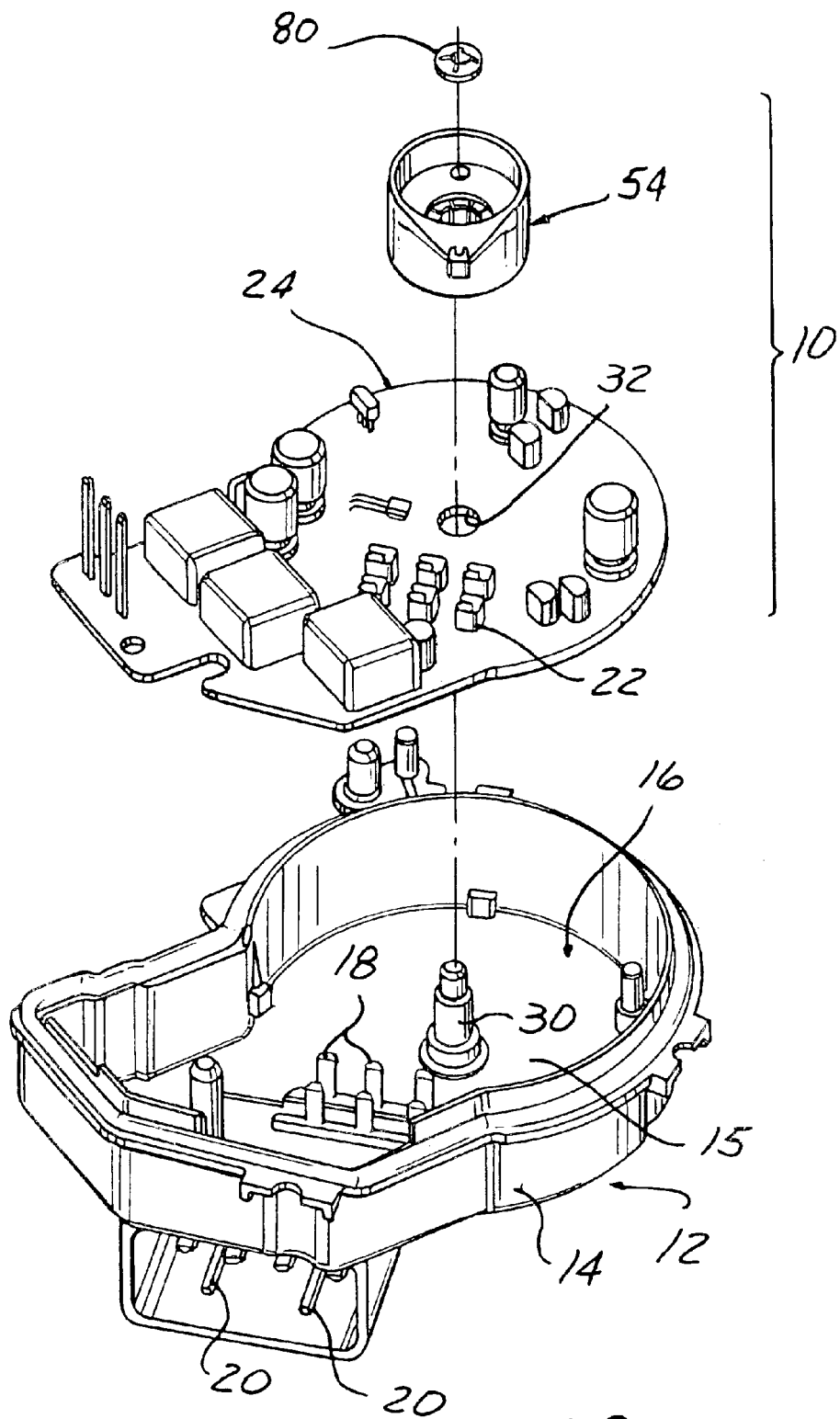
FIG. 1 is an exploded, perspective view of a portion of a windshield wiper drive apparatus housing containing a non-contact park switch according to the present invention.
Figure 2:
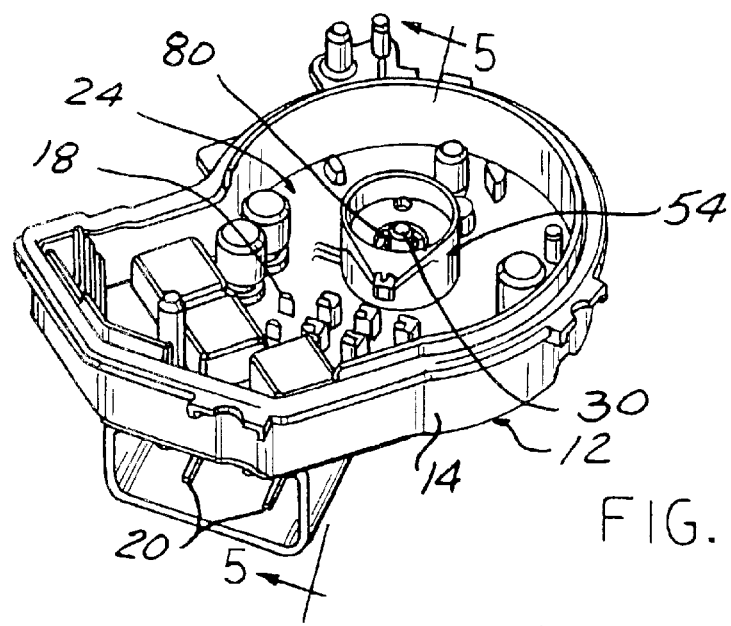
FIG. 2 is a perspective view of the windshield wiper drive apparatus shown in FIG. 1, depicted in an assembled position.
Figure 5:
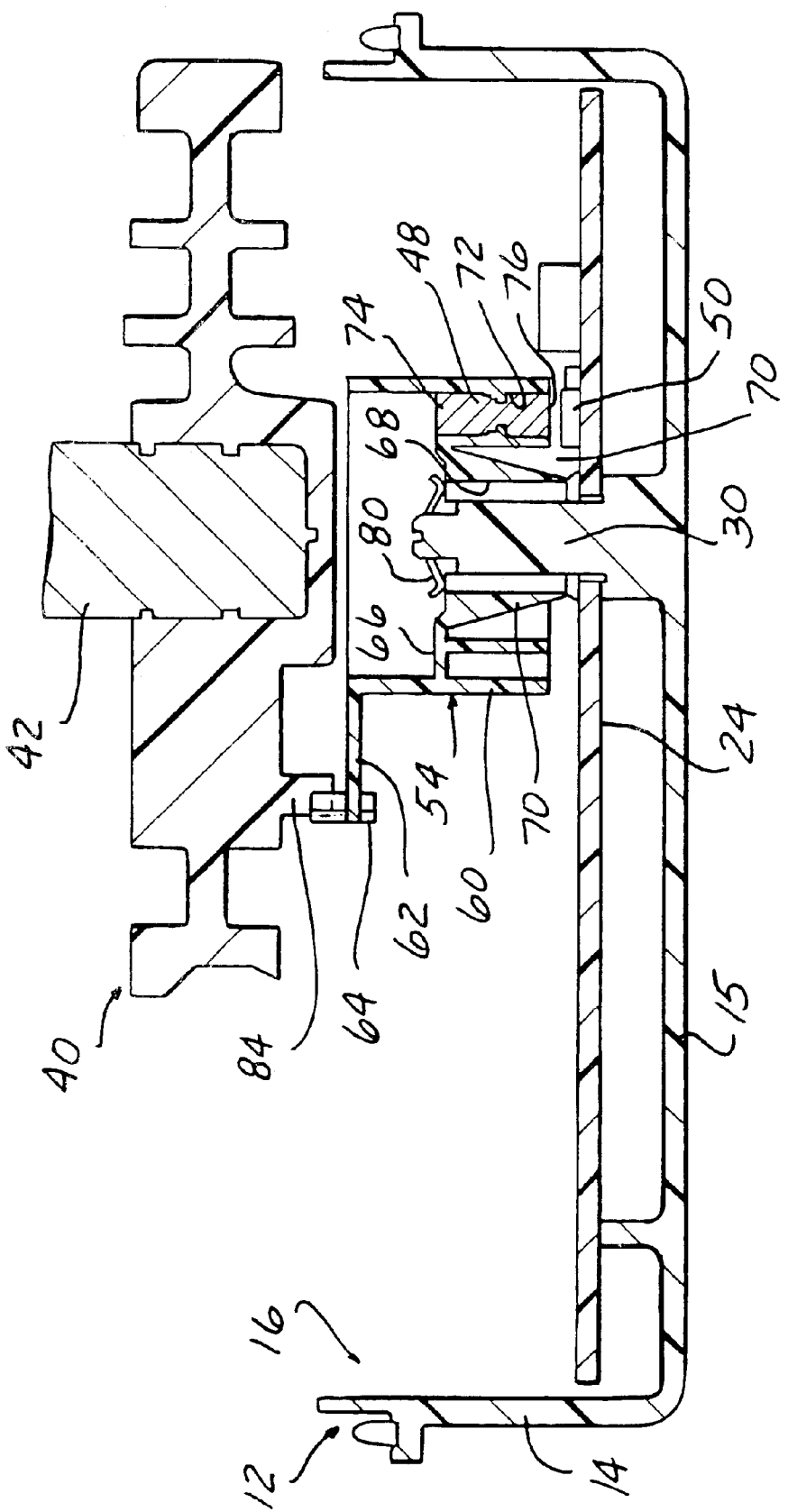
FIG. 5 is a cross sectional view generally taken along line 5—5 in FIG. 2.

Referring now to the drawing, and to FIGS. 1, 2 and 5 in particular, there is depicted a portion of a windshield wiper drive mechanism or apparatus denoted generally by reference number 10.

A cup-shaped housing 12 is provided with a peripheral sidewall 14 which surrounds an internal cavity or chamber 16 and a base 15. Terminals 18 are mounted in the interior cavity 16 and communicate with external pins 20 for communicating electrical signals externally of the housing 12.

The terminals 18 engage connectors 22 mounted on a printed circuit board 24 which is disposable within the interior cavity 16 in the housing 12. The connectors 22 provide electrical contact between the terminals 18 and various conductive traces formed in the circuit board 24 and electrical components mounted on the circuit board 24.

By way of example only, the aspect of the present invention shown in FIGS. 1 and 2 includes a printed circuit board 24 which provides an intermittent wiper control. It will be understood that the present invention is also usable with a non-intermittent wiper drive assembly wherein the circuit board 24 or, at least the intermittent wiper control circuit, on the circuit board can be eliminated.

As shown in FIGS. 1, 2, and 5, a spindle 30 is mounted on a bottom portion of the housing 12 within the interior chamber 16. The spindle 30 is slidable through an aperture 32 in the printed circuit board 24 to secure the printed circuit board 24 within the interior chamber 16 of the housing 12.

It will be understood that the exterior shape of the housing 12 as well as the shape of the interior cavity 16 in the housing 12 and the printed circuit board 24 are exemplary only as these components may have other shapes. However, one important advantage of the present invention is that a single housing design as well as a single mating drive gear design, may be employed for both intermittent and non-intermittent wiper drive apparatus. This provides a common design for most windshield wiper drive assemblies thereby reducing production costs.

As shown in FIG. 5 and as is conventional in wiper drive apparatus, a drive gear 40 is mountable in juxtaposition over the interior chamber 16 in the housing 12. The gear 40 is mounted about an output shaft 42 that extends into a separate gear housing for attaching to the drive motor, not shown. The gear housing is fixed to the sidewall 14 of the housing 12. Since the gear housing and drive motor are conventional and well understood in the present art, such features are not shown in FIG. 5 for clarity in understanding of the present invention.

The drive gear 40 is rotated by a worm gear connected to or mounted on the output shaft of the wiper drive motor, both of which are not shown in FIG. 5. Rotation of the drive gear 40 is imparted to the output shaft 42 which is connected to the wiper crank arm, not shown. The crank arm is part of a conventional wiper linkage which converts the rotary movement of the output shaft 42 to oscillation movement of the wiper arms and the attached wiper blades across a vehicle window surface.

During oscillatory movement, the windshield wipers, which include the wiper blades and wiper arm assembly, move between an outwipe and inwipe position. The inwipe position is also known as a park position for wiper designs which do not have a separate retracted or stored park position. It is necessary to discontinue the application of electrical power to the wiper drive motor when the wipers have reached the park position. Thus, it becomes necessary to detect when the wiper blades reach the inwipe position.

According to the present invention, a unique position sensor is provided in the wiper drive apparatus for detecting when the wipers reach the inwipe or park position. The position sensor generates a signal which is utilized to discontinue electrical power to the drive motor to prevent further movement of the wiper blades.

The position detector of the present invention preferably includes a permanent magnet 48 and a magnetic field detector 50. Preferably the magnetic field detector 50 is a Hall effect magnetic field detector or sensor.

In the example of the present invention shown in FIGS. 1, 2 and 5, the Hall effect sensor 50 is mounted on the printed circuit board 24.

The position detector of the present invention is embodied in two different configurations. One aspect of the detector is shown in FIGS. 1–5 in which a switch trigger cam 54 is rotatably mounted about the spindle 30 in the interior chamber 16 of the housing 12. It will be understood that the following specific description of the construction of the switch trigger cam 54 will be by way of example only as other configurations may also be used for the switch trigger cam 54.

Figure 3:
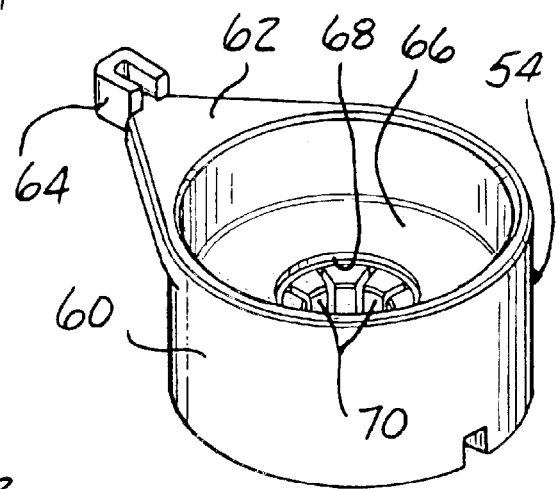
FIG. 3 is a top perspective view of a switch trigger cam assembly shown in FIG. 1.
Figure 4:
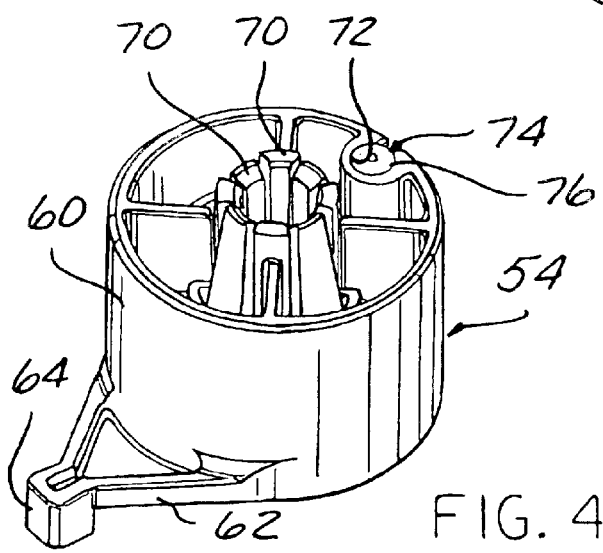
FIG. 4 is a bottom perspective view of the switch trigger cam assembly shown in FIG. 3.

Accordingly, as shown in detail in FIGS. 3–5, the switch trigger cam 54 includes an outer sidewall 60, preferably having a circular cross section, although other shapes are also possible. A flange 62 projects from one end of the sidewall 60 and terminates in an interengaging member, such as a projection or post 64.

An interior wall 66 is formed within the sidewall 60 and is spaced from the end of the sidewall 60 carrying the flange 62. A bore 68 extends through the wall 66 toward an opposed end of the sidewall 60. A plurality of spring or resilient fingers 70 are unitarily formed or molded as part of the wall 66 and extend through the bore 68. The fingers 70 provide a spring force for providing friction and resistance to free wheeling rotation of the switch trigger cam 54 about the spindle 30.

A bore 72 is formed in the switch trigger cam 54 adjacent to the sidewall 60 as shown in FIGS. 4 and 5. The bore 72 receives a permanent magnet 48 which preferably has a cylindrical shape, by way of example only. As shown in FIGS. 4 and 5, one end 76 of the magnet 48 is exposed through one end of the switch trigger cam 54. The exposed end 76 of the magnet 48 is spaced from the sensor 50 as shown in FIG. 5 and is positioned to lie in an intersecting rotatable path with the sensor 50 during rotation of the switch trigger cam 54.

A retainer or clip 80 is mountable over the upper end of the spindle 30 in engagement with the wall 66 in the switcher trigger cam 54 to bias the switch trigger cam 54 in position on the spindle 30.

When the switch trigger cam 54.is mounted on the spindle 30, as shown in FIG. 5, the projection 64 at the end of the flange 62 will lie in an intersecting rotatable path with a corresponding interengaging member or projection 84 formed on the drive gear 40. In this manner, since the drive gear 40 is driven in one normal direction of rotation, the projection 84 on the drive gear 40 will engage the projection 64 on the switch trigger cam 54 thereby rotating the switch trigger cam 54 about the spindle 30 in the same direction of rotation as the drive gear 40. During each rotation, the magnet 48 carried on the switch trigger cam 54 will pass by the sensor 50. This passage will be detected by the sensor 50 which then generates an output signal to the control circuitry of the wiper drive apparatus, not shown. If the driver of the vehicle has moved the wiper control lever or switch to an "off" position, the output signal from the sensor 50, which is indicative of the windshield wipers reaching the in wipe or park position, will be used by the wiper drive circuitry to disconnect electrical power to the wiper drive motor thereby leaving the wiper blades in the in wipe or park position.

One important advantage of the use of the switch trigger cam 54 shown in FIGS. 3–5 comes into play when the wiper blades strike an objection when moving to the inwipe position, such as an accumulation of snow on the vehicle cowl. Although the torque produced by the wiper drive motor may be sufficient to move the wiper blades to the park position, the obstruction or snow can generate sufficient force to back drive the wiper blades away from the park position in a reverse direction of movement. This back drive will be transmitted by the wiper blades and the wiper drive linkage and crank arm to the drive gear which then rotates in a opposite direction of rotation from its normal rotation direction. This reverse movement of the drive gear could cause the contacts in prior art wiper drive apparatus to re-engage conductive traces on the drive gear or circuit board and reapply electrical power to the drive motor causing the wiper blades to reverse direction and move again toward the park position. This results in an oscillatory action of the wiper blades and an objectionable chatter as well as potentially leading to failure of the drive motor, the contacts or damage to the wiper drive linkage.

In the aspect of the invention shown in FIG. 1, the use of the switch trigger cam 54 eliminates any back drive. The projection 84 on the drive gear 40 will engage the projection 64 on the switch trigger cam 54 only in the normal direction of rotation of the drive gear 40. If the drive gear 40 is back driven, as described above when the wiper blades strike an obstruction upon reaching the inwipe or park position, the projection 84 will disengage and move away from the projection 64 on the switch trigger cam 54 thereby leaving the switch trigger cam 54 in the last position corresponding to the wipers being in the inwipe position which resulted in the signal from the sensor 50 used by the wiper drive circuitry to disconnect electrical power to the wiper drive motor. In this instance, the wiper drive motor remains disconnected from electrical power and does not impart the oscillatory movement of the wiper blades into and out of the inwipe or park position as in previous wiper designs.

Figure 6:
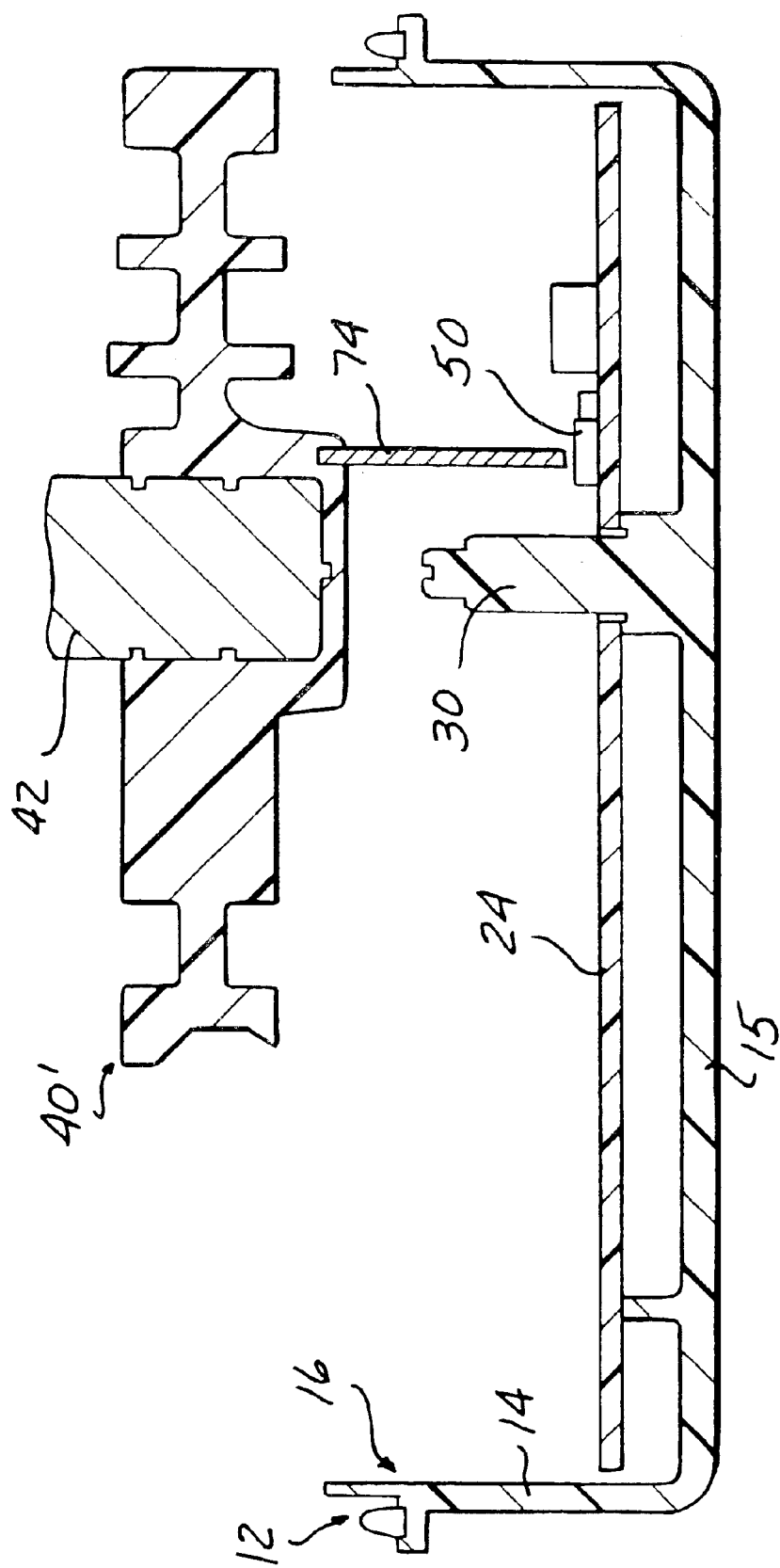
FIG. 6 is a side elevational view, similar to FIG. 5, but showing an alternate aspect of the position sensor of the present invention.

Another aspect of the present invention is shown in FIG. 6 wherein the non-contact sensor is still employed to detect rotation of the drive gear 40 coincident with the wiper blades reaching the inwipe or park position. However, this aspect of the invention lacks the unidirectional rotation of the magnet as provided by the use of the switch trigger cam 54.

As shown in FIG. 6, in this aspect of the invention, the magnet 74 is mounted in the drive gear 40', such as in a central hub portion of the drive gear 40. However, the one end of the magnet 74 is still positioned to overlay and pass by the sensor 50 mounted within the housing 12 during rotation of the drive gear 40' to indicate that the wiper blades have reached the inwipe or park position.

Thus, there has been disclosed a unique windshield wiper blade position detector which utilizes a non-contact position sensor to detect the wiper blades reaching the inwipe or park position. The use of the non-contact sensor increases the long term, reliable use of the wiper drive apparatus of the present invention due to the elimination of electrical contacts which are susceptible to wear, contact interruption via external matter, etc. In one aspect, the wiper drive apparatus also includes a unidirectional position sensor operation which eliminates any back drive of the park position switch and the resulting oscillatory motion, objectionable chatter and potential damage to the wiper drive apparatus as in previous wiper systems.

What is claimed is:

1. A windshield wiper drive apparatus comprising:

a rotatable drive gear for driving a windshield wiper;

a non-contact position detector for detecting a rotation position of the drive gear corresponding to a windshield wiper park position; and a cam rotatably connected to the drive gear.

2. The windshield wiper apparatus of claim 1 wherein the position detector comprises:

a magnetically responsive senor; and a magnet movably disposed in an intersecting path of movement with respect to the sensor, the magnet movable with the drive gear, the sensor detecting each passage of the magnet therepast.

3. The windshield wiper apparatus of claim 2 wherein the magnet is mounted on the drive gear.

4. A windshield wiper drive apparatus comprising:

a housing;

a rotatable drive gear coupled to a windshield wiper for driving the windshield wiper, the drive gear rotatable mounted in the housing; and a non-contact position detector cooperatively arranged between the drive gear and the housing to detect a rotation position of the drive gear corresponding to a windshield wiper park position;

a cam rotatably mounted in the housing, a magnet carried on the cam; and interengaging members carried on the drive gear and the cam for rotating the cam along with rotation of the drive gear in the normal direction of rotation of the drive gear.

5. The windshield wiper apparatus of claim 4 wherein the interengaging members comprise:

a projection carried on the drive gear; and a projection carried on the cam, the projections on the drive gear and the cam lying intending paths of movement.

6. The windshield wiper drive apparatus of claim 4 wherein:

the interengaging members provide only unidirectional rotation of the cam.

7. The windshield wiper drive apparatus of claim 4 wherein:

the interengaging members on the drive gear engages the interengaging member on the cam only in a normal direction of rotation of the drive gear.

* * * * *